United States Patent [19]

Leu et al.

[11] Patent Number: 5,173,318
[45] Date of Patent: Dec. 22, 1992

[54] METHOD AND APPARATUS FOR AGING A DISTILLED LIQUOR

[75] Inventors: Sheng-I Leu, No. 26, Lane 25, Weng-Heng I Rd.,, Kaohsiung; I-Chang Lin, No. 40-1, Alley 18, Lane 127, Nan-Shan Rd.,, Chungho; Ching-Yu Chen, Kaohsiung; Chen-Shun Chen, 2nd Fl., No. 320, Liao-Ning I St.,, Kaohsiung, all of Taiwan

[73] Assignees: Sheng-I Leu, Kaohsiung; I-Chang Lin, Chungho; Chen-Shun Chen, Kaohsiung; Jhy-Ming Lee, Kaohsiung, all of Taiwan

[21] Appl. No.: 707,143

[22] Filed: May 30, 1991

[51] Int. Cl.⁵ .............................................. C12H 1/00
[52] U.S. Cl. .................... 426/238; 99/277.1; 99/277.2; 426/316; 426/592
[58] Field of Search ............... 426/236, 238, 316, 592; 99/277.1, 277.2, 287, 323.1

[56] References Cited

U.S. PATENT DOCUMENTS 503,168 8/1893 Schneider ........................... 426/236
3,282,571 11/1966 Guggenberger .................... 426/238

Primary Examiner—George Yeung
Attorney, Agent, or Firm—Harness, Dickey & Pierce

[57] ABSTRACT

A method for aging a fermented product includes the steps of: (a) cooling the fermented product in a container; (b) introducing ozone in the cooled fermented product for oxidation; and (c) applying an ultrasonic vibration to the container to vibrate and heat the fermented product in step (b) for oxidizing the fermented product. An aging device for a fermented product includes: an aging tank for containing the fermented product, the aging tank having an inlet and an outlet for the fermented product; an ozone supplying unit having an inlet pipe and an outlet pipe which are connected to the aging tank; a cooling unit mounted to the aging tank; an ultrasonic vibration unit mounted to the aging tank; and a thermometer mounted on the aging tank to detect the temperature of the fermented product. A method for preparing a distilled liquor includes the steps of (a') distilling a fermented precursor; (b') chilling the distilled fermented precursor; and (c') aging the chilled fermented precursor by the aging method described above.

3 Claims, 10 Drawing Sheets

METHOD AND APPARATUS FOR AGING A DISTILLED LIQUOR

FIELD OF THE INVENTION

This invention relates to a method and device for aging a fermented product, more particularly to a method and device for quickly aging a fermented product.

DESCRIPTION OF RELATED ART

To make a conventional distilled liquor includes fermenting a cereal product by the addition of enzymes, distilling the fermented cereal product and then continuing the aging process. The distilled fermented cereal product to be aged is not completely purified and may have some undesired particles therein. The distilled fermented cereal product is generally aged for several years. Although hydrogen peroxide or vitamin C is sometimes added during aging, the aging time can not be reduced by very much. The distilling of liquor is not economical and is difficult to mass produce due to the long time it takes to age.

SUMMARY OF THE INVENTION

Therefore, the objective of this invention is to provide a method for quickly aging a fermented product, a quick-aging device for a fermented product, and a method for preparing a distilled liquor having a step of chilling to precipitate undesired particles.

Accordingly, a method for aging a fermented product includes the steps of: (a) cooling the fermented product in a container; (b) introducing ozone in the cooled fermented product for oxidation; and (c) applying an ultrasonic vibration to the container to vibrate and heat the fermented product in step (b) for oxidizing the fermented product.

An aging device for a fermented product includes: an aging tank for containing the fermented product, the aging tank having an inlet and an outlet for the fermented product; an ozone supplying unit having an inlet pipe and an outlet pipe which are connected to the aging tank; a cooling unit mounted to the aging tank; an ultrasonic vibration unit mounted to the aging tank; and a thermometer mounted in the aging tank to detect the temperature of the fermented product.

A method for preparing a distilled liquor includes the steps of: (a') distilling a fermented precursor; (b') cooling the fermented precursor in a container; (c') introducing ozone in the cooled fermented precursor for oxidation; and (d') applying an ultrasonic vibration to the container to vibrate and heat the fermented precursor in step (c') for oxidizing the fermented precursor. Such a method further includes the step of chilling the distilled fermented precursor in step (a') to precipitate undesired particles.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
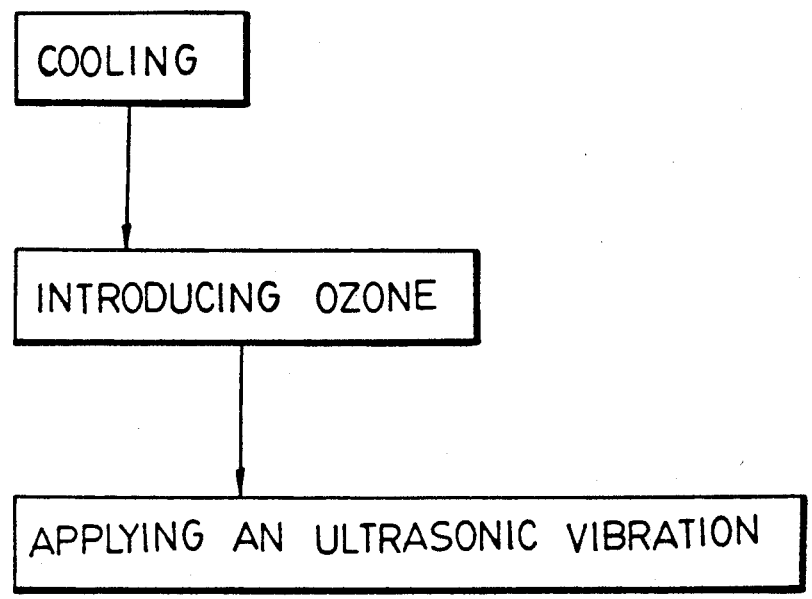
FIG. 1 is a flow chart of aging a fermented product of this invention.

FIG. 1 shows a flow chart for method of aging a fermented product of this invention. The method includes the steps of: (a) cooling a fermented product in a container; (b) introducing ozone into the cooled fermented product for oxidation; and (c) applying an ultrasonic vibration to the container to vibrate and heat the fermented product in step (b) for oxidizing the fermented product.

Figure 2:
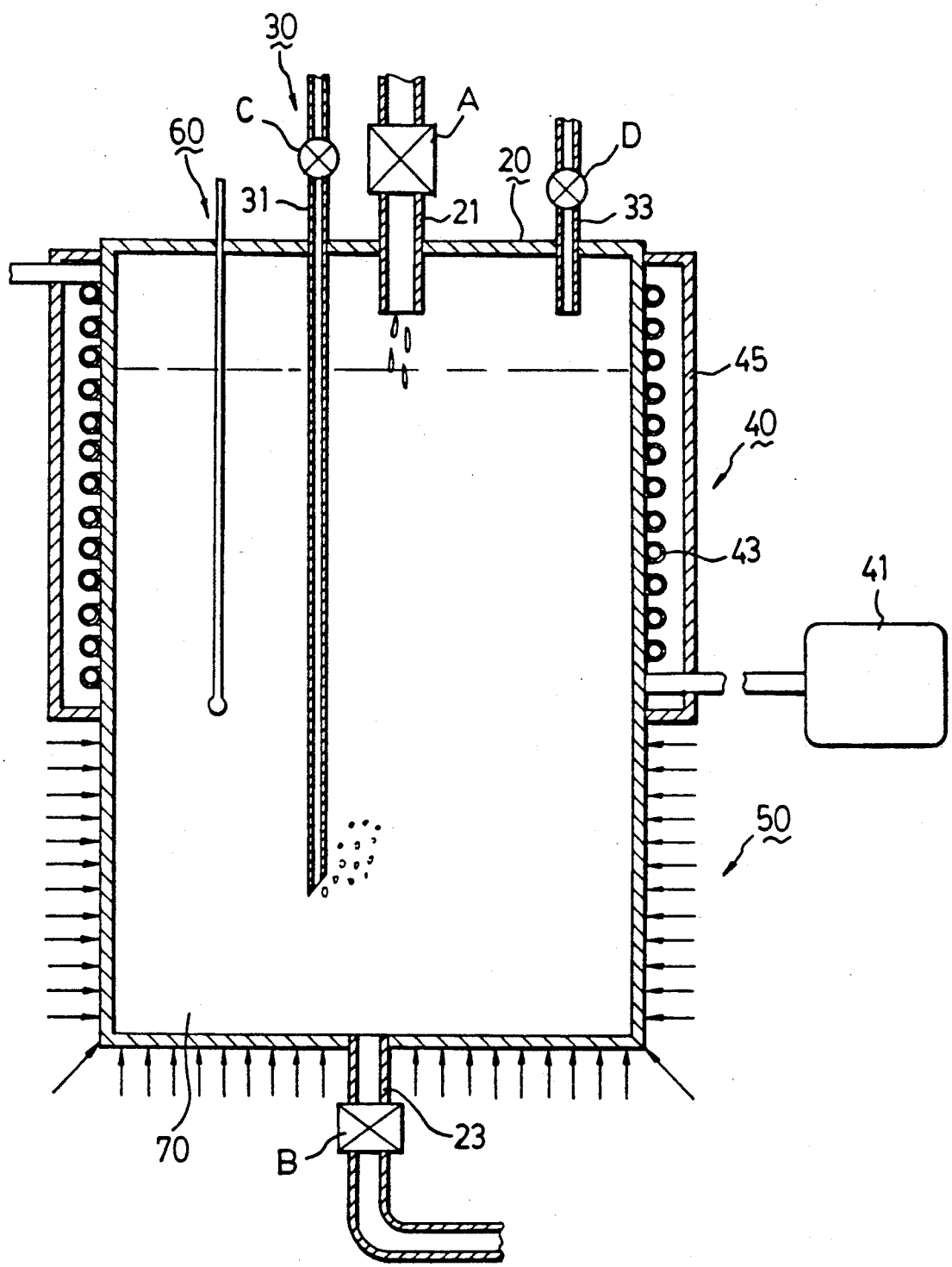
FIG. 2 is a schematic sectional view of an aging device of this invention for a fermented product.

Referring to FIG. 2, an aging device of this invention for a fermented product includes: an aging tank (20) having an inlet (21) and an outlet (23) respectively with two controlling valves (A) and (B); an ozone supplying unit (30) having an inlet pipe (31) and an outlet pipe (33) which are connected to the aging tank (20) and respectively have two controlling valves (C) and (D); a cooling unit (40) including a compressor (41) and a condensing tube (43) which is mounted to the upper portion of the aging tank (20) and is provided with a heat-insulating member (45); an ultrasonic vibration unit (50) mounted to the lower portion of the aging tank (20); and a thermometer (60) mounted on the aging tank (20) to detect the temperature of the fermented product.

A liquid fermented product (70), such as a Taiwan kaoliang wine or a rice wine, is contained in the aging tank (20). Ozone is introduced to the aging tank (20) through the inlet pipe (31) of the ozone supplying unit (30). The cooling unit is controlled to keep the liquid fermented product (70) at about $-10°$ C. to $+10°$ C., and to effectuate the dissolving of ozone in the liquid fermented product (70). The excessive ozone which is not dissolved in the liquid fermented product (70) is sent out through the outlet pipe (33). The ultrasonic vibration unit (50) is applied at a frequency of 15000 to 150,000 Hz/sec to vibrate and heat the liquid fermented product (70) in order to oxidize the liquid fermented product (70) until the liquid fermented product (70) reaches a temperature of 35° C. Thereby, an aged product is obtained. The time of aging, from applying the liquid fermented product (70) to the aging tank (20) to obtaining the aged product, is about 3 to 24 hours. The aging time is much shorter than that of the conventional aging method. When making soybean sauce, vinegar, and brew wine, the temperature of the aging tank is kept at about 4° C., $-10°$ C., and $-5°$ C., respectively.

Therefore, the method and device of this invention for aging a fermented product is more economical and can be used for the mass production of a distilled liquor or other similar products where aging is required.

Figure 3:
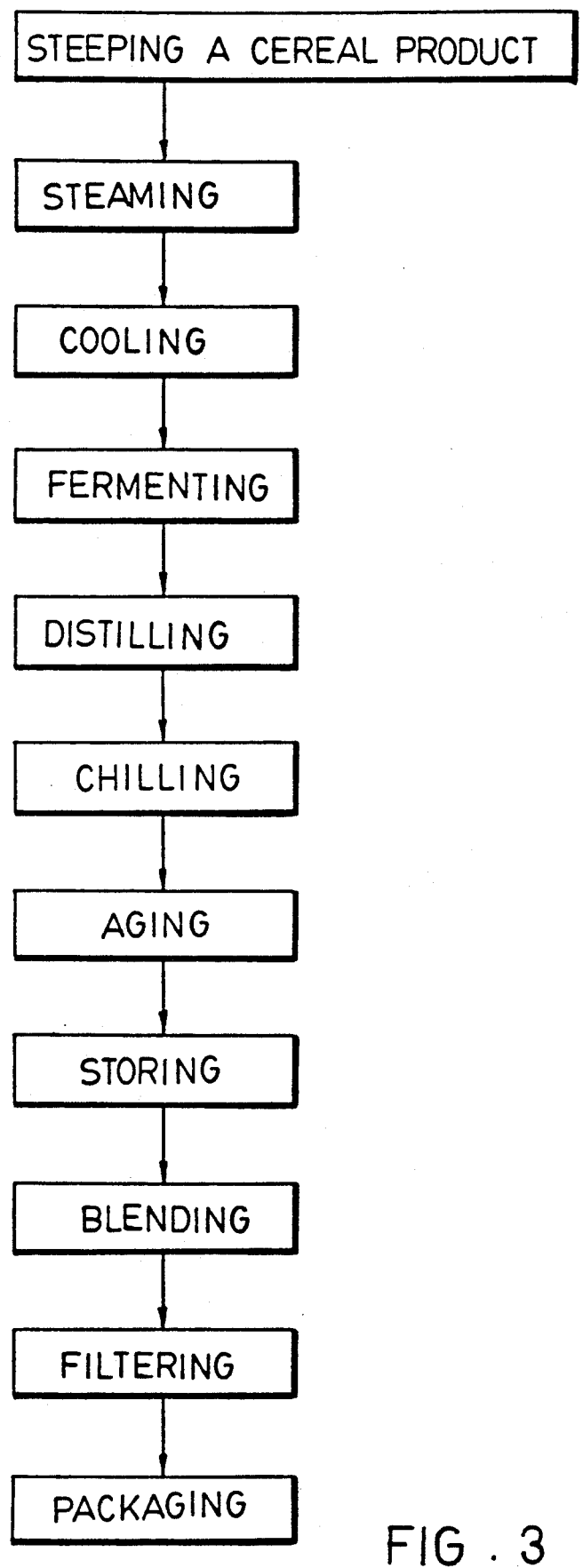
FIG. 3 is a flow chart of preparing a distilled liquor having a step of chilling of this invention.

FIG. 3 shows a flow chart of a method for preparing a distilled liquor incorporating the present invention.

A cereal product, such as rice or corn, is steeped for about 15 days to 30 days, subsequently steamed at a temperature of 100° C., and then cooled to about 25° C. to 30° C. The cooled cereal product is fermented by the addition of enzymes from certain fungi and subsequently distilled. The distillate is chilled to about −10° C. in order to precipitate undesired solid particles. Because the distilled liquor contained in the distillate does not freeze and can be separated from the undesired solid particles at −10° C., there are no undesired solid particles in the distillate, as is the case in the conventional distillate. Then, the chilled and separated distillate is aged for about 3 hours to 24 hours by the aging method of this invention explained above. The aged product is kept at a temperature of about 25° C. and stored in a storage cask such as an oak barrel. Then, it is blended with an old distilled liquor and filtered. Finally, the product is packaged.

Figure 4A:
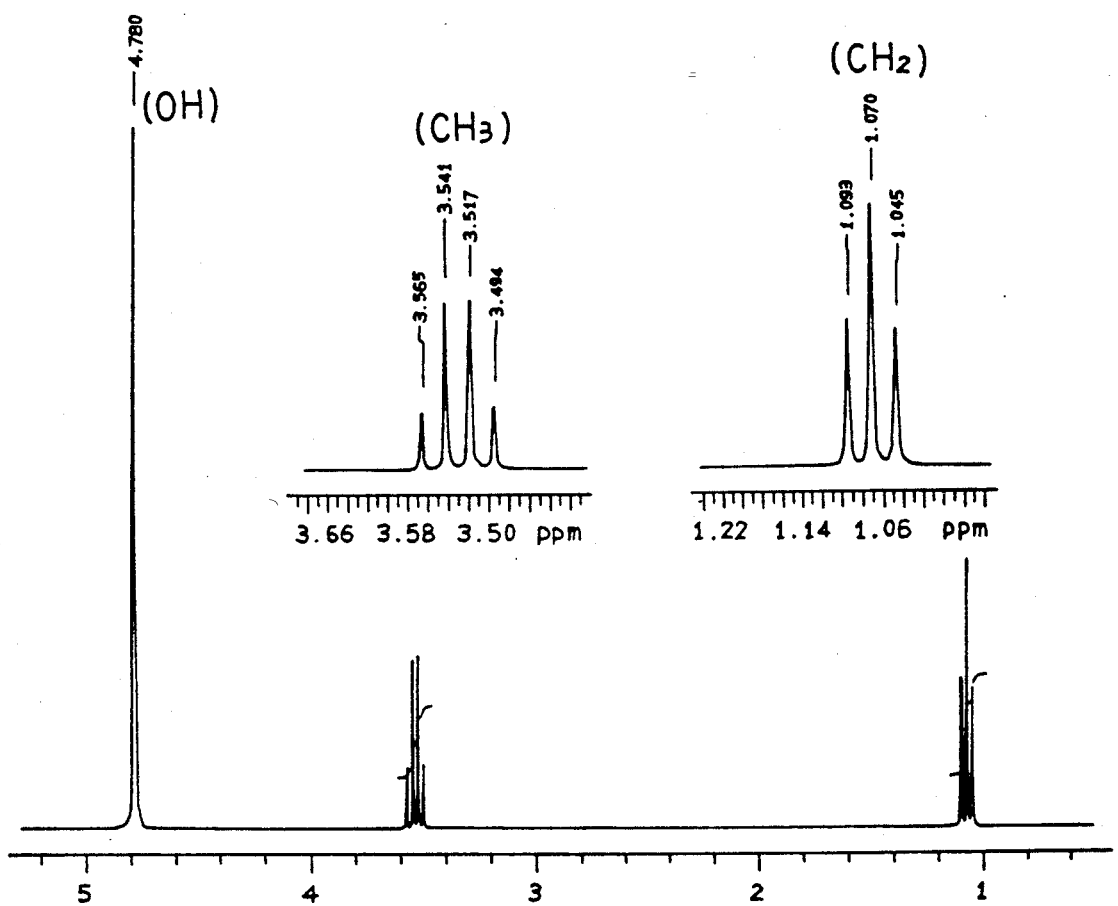
FIG. 4(A) is a NMR (nuclear magnetic resonance) spectrum of a Taiwan kaoliang wine.
Figure 4B:
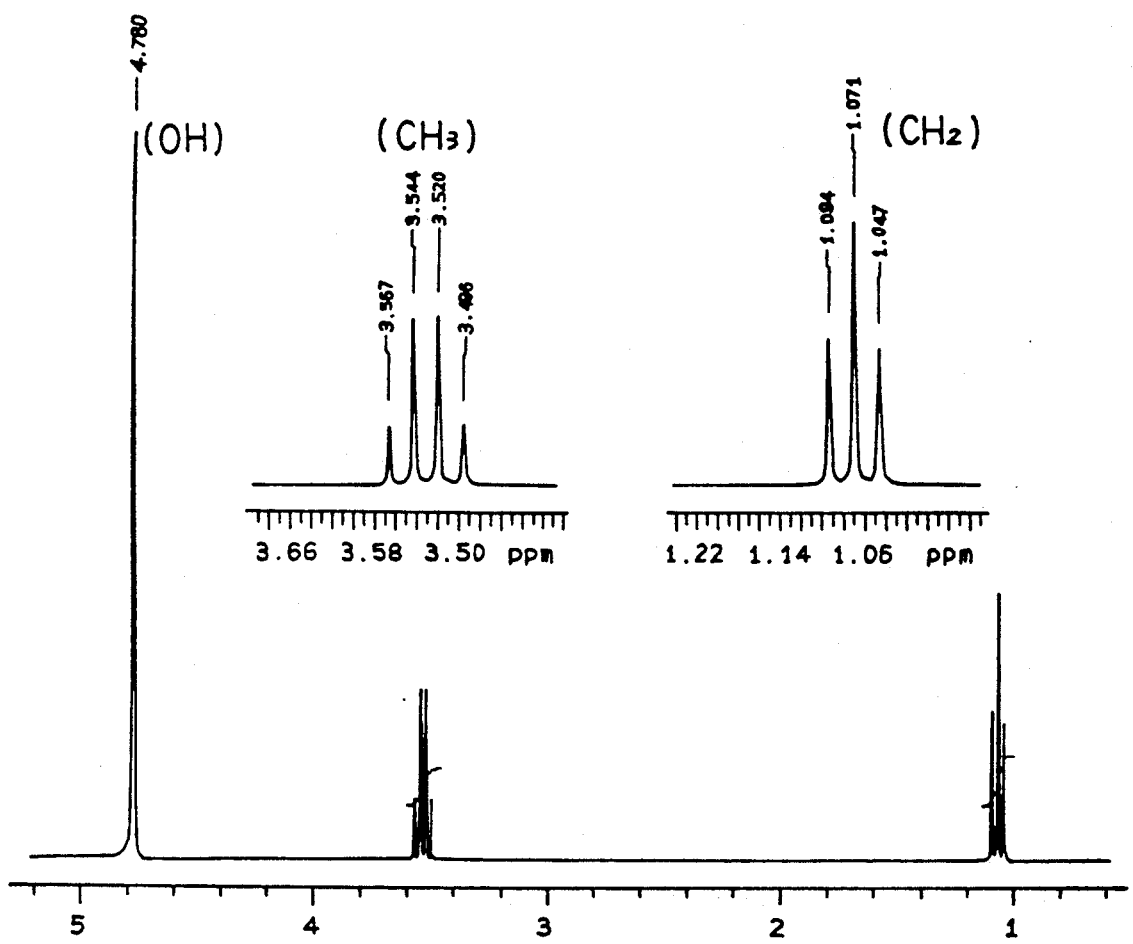
FIG. 4(B) is a NMR spectrum of an Taiwan kaoliang old wine which is stored for 8 years.
Figure 4C:
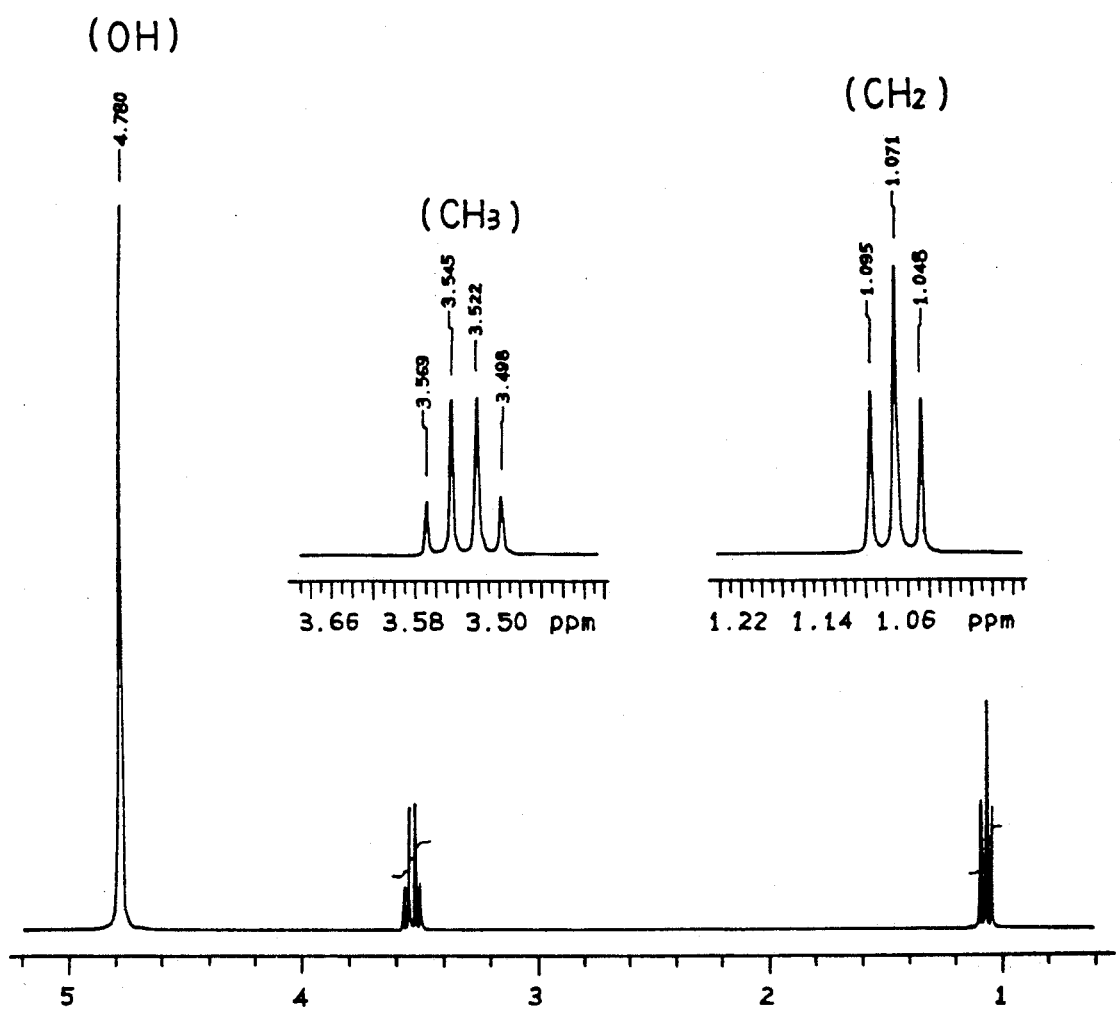
FIG. 4(C) is a NMR spectrum of a Taiwan kaoliang old wine which is aged for 15 hours by the aging method of this invention.

FIG. 4(A) shows a NMR spectrum of a Taiwan kaoliang wine. FIG. 4(B) shows a NMR spectrum of an Taiwan kaoliang old wine which is stored for 8 years. FIG. 4(C) shows a NMR spectrum of a Taiwan kaoliang old which is aged for 15 hours by the aging method of this invention. The resonance peaks of a methyl (CH$_3$) proton are at 3.565, 3.541, 3.517, and 3.949 in FIG. 4(A); 3.567, 3.544, 3.520, and 3.496 in FIG. 4(B); and 3.569, 3.545, 3.522, and 3.498 in FIG. 4(C).

Figure 5A:
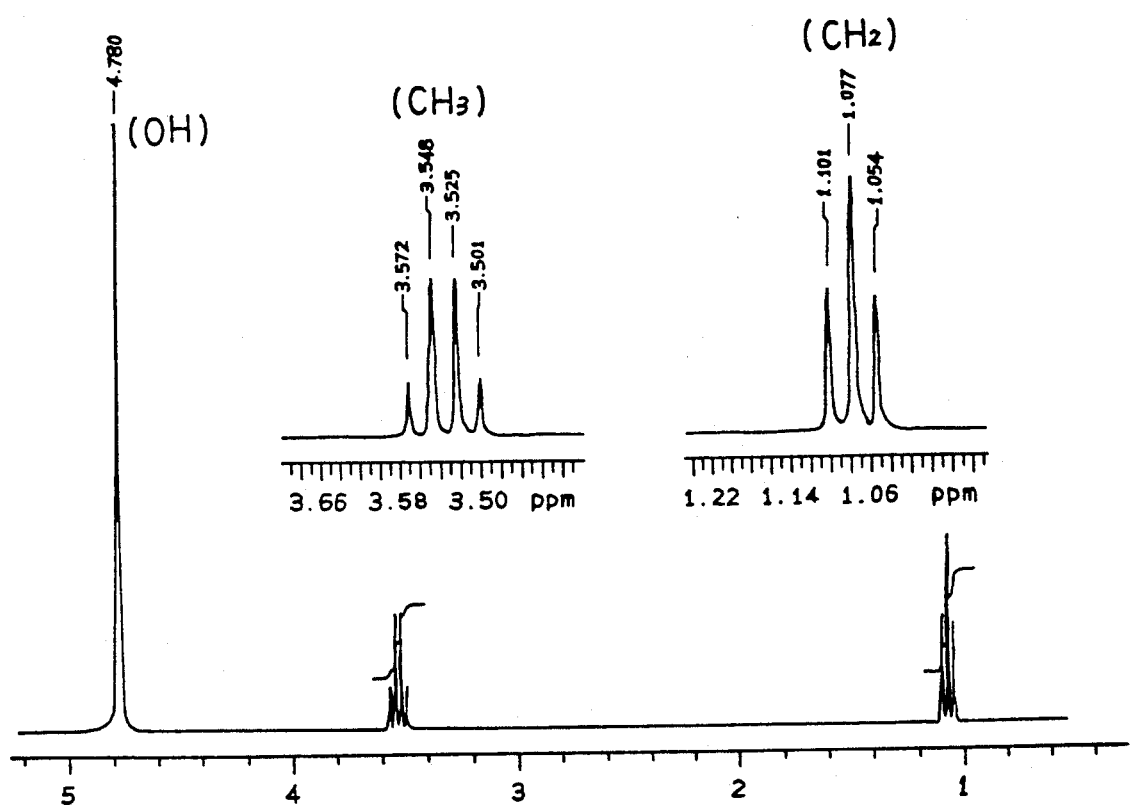
FIG. 5(A) is a NMR spectrum of a rice wine which has an alcohol content of 53.5%.
Figure 5B:
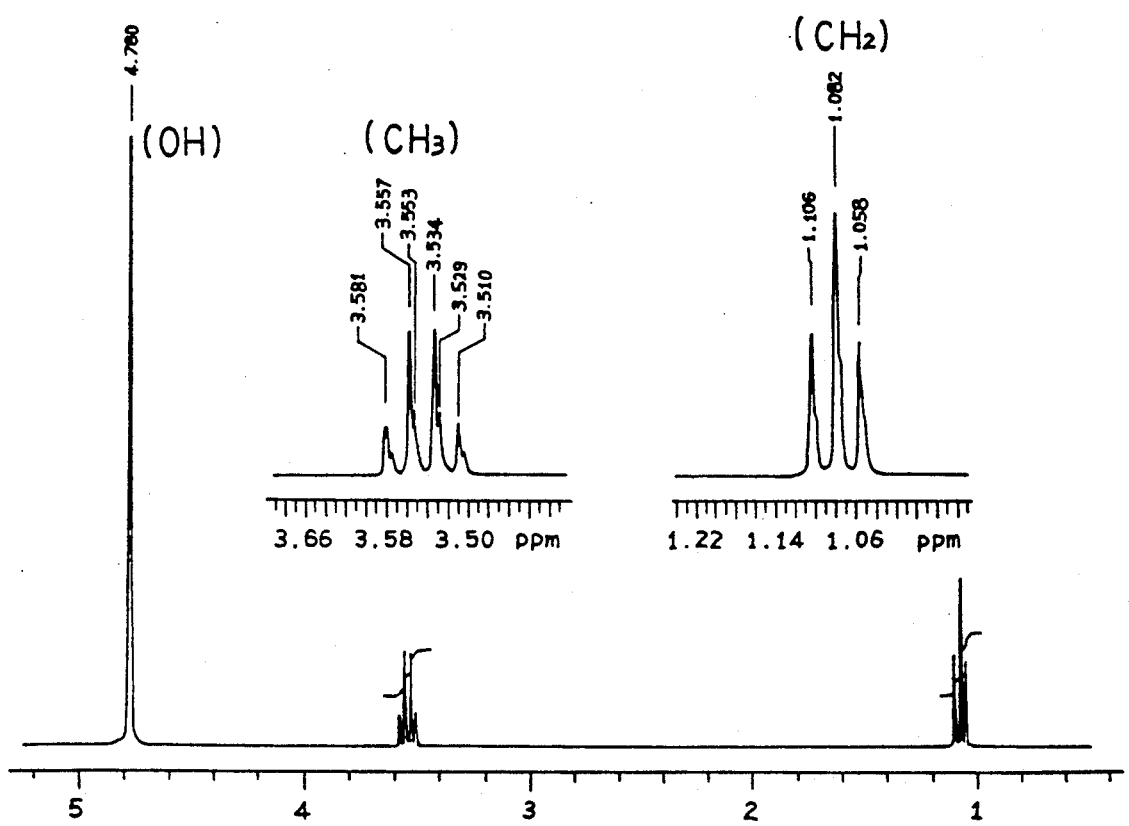
FIG. 5(B) is a NMR spectrum of a rice wine which has an alcohol content of 53.5% and is aged for 15 hours by the aging method of this invention.
Figure 6A:
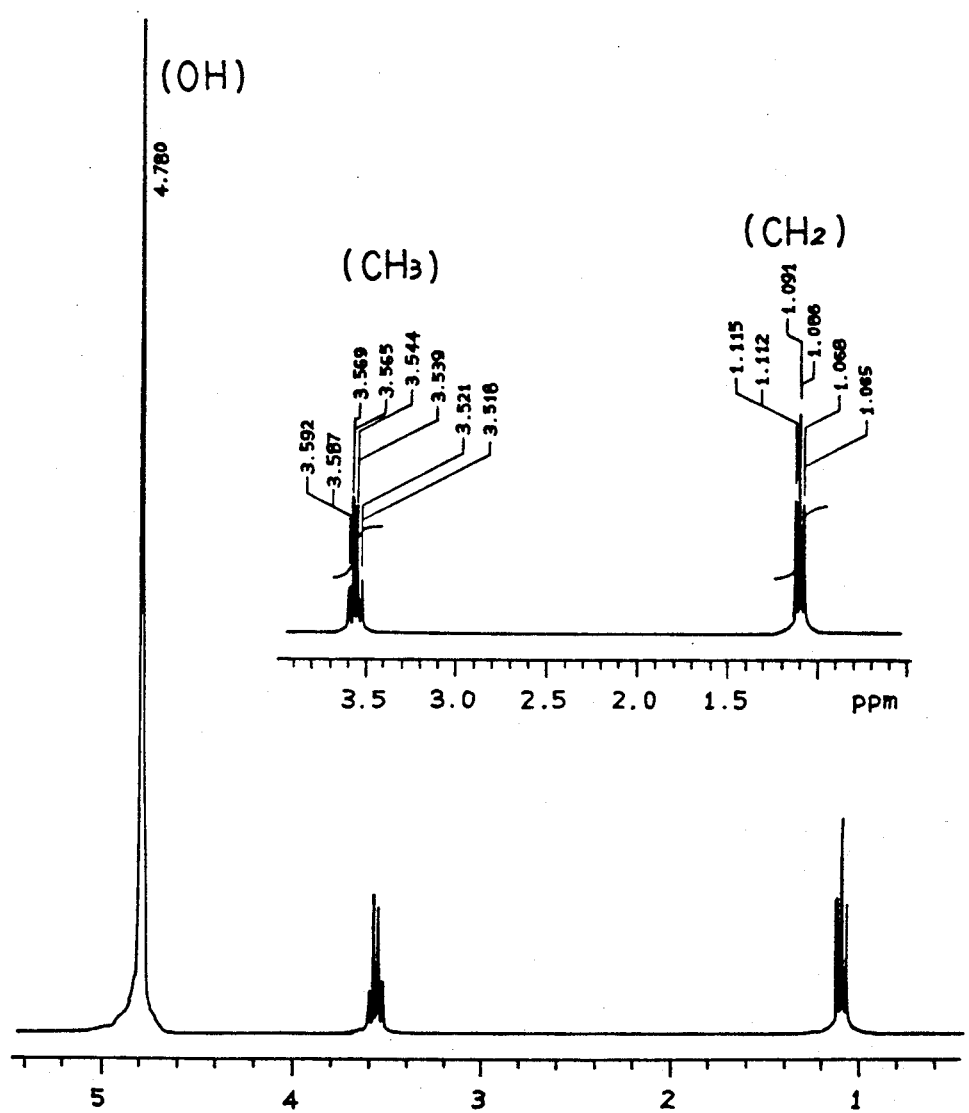
FIG. 6(A) is a NMR spectrum of a rice wine which has an alcohol content of 44.9%.
Figure 6B:
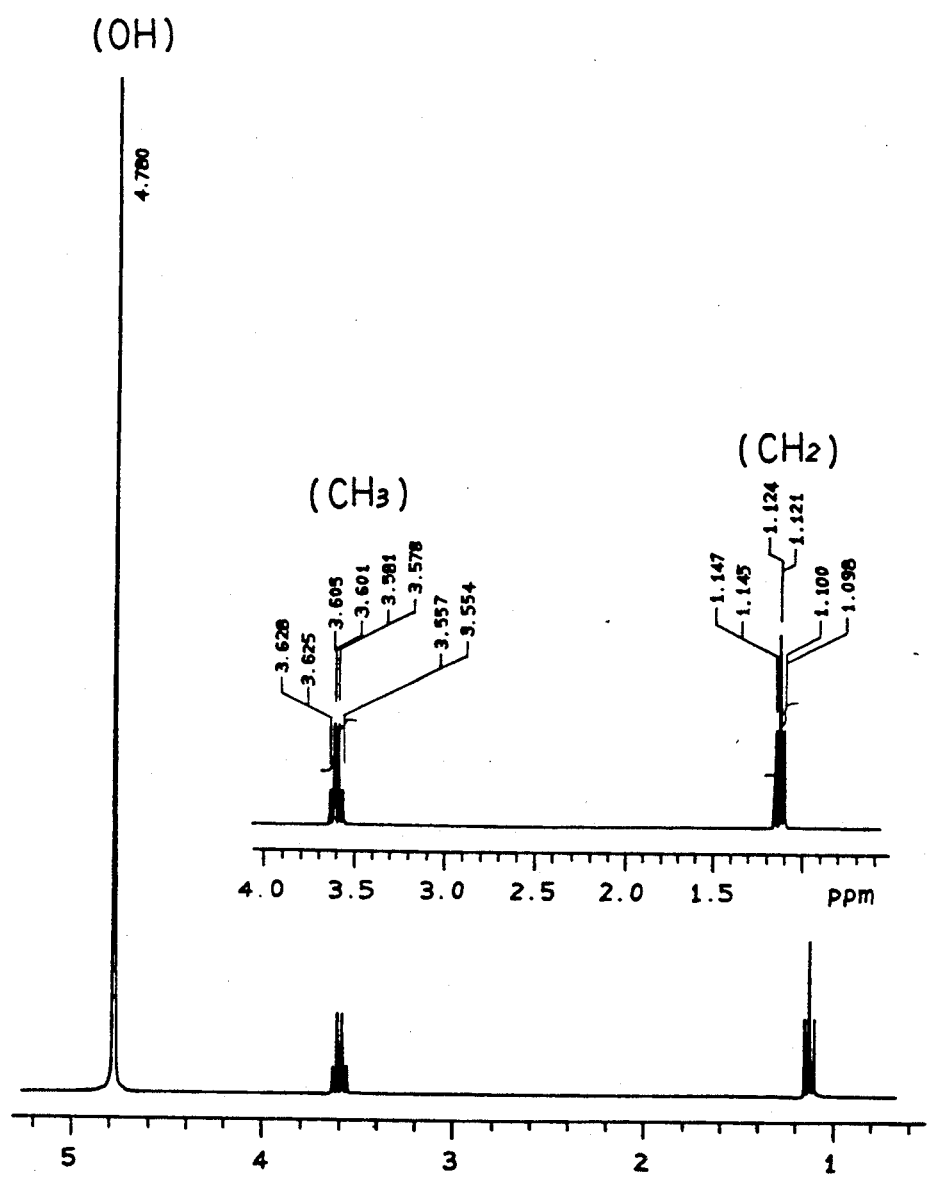
FIG. 6(B) is a NMR spectrum of a rice wine which has an alcohol content of 44.9% and is aged for 23 hours by the aging method of this invention.

Like FIGS. 4(A) to 4(C), FIG. 5(A) shows a NMR spectrum of a rice wine which has an alcohol content of 53.5%. FIG. 5(B) shows a NMR spectrum of a rice wine which has an alcohol content of 53.5% and is aged for 15 hours by the aging method of this invention. The resonance peaks of a methyl (CH$_3$) proton are at 3.572, 3.548, 3.525, and 3.501 in FIG. 5(A), and 3.581, 3.557, 3.553, 3.534, 3.529, and 3.501 in FIG. 5(B). FIG. 6(A) shows a NMR spectrum of a rice wine which has an alcohol content of 44.9%. FIG. 6(B) shows a NMR spectrum of a rice wine which has an alcohol content of 44.9% and is aged for 23 hours by the aging method of this invention.

Therefore, a product by the aging method of this invention has good aging effect.

While the present invention has been described in connection with what is considered the most practical and preferred embodiment, it is understood that this invention is not limited to the disclosed embodiment, but is intended to cover various arrangements included within the spirit and scope of the broadest interpretations and equivalent arrangements.

I claim:

1. A method of quickly aging a distilled liquor comprising:
    (a) cooling a distilled liquor in a container to about −10° C.;
    (b) introducing ozone into said cooled distilled liquor for oxidation; and
    (c) after step (b), applying an ultranonic vibration at a frequency of 15.000 Hz/sec to 150.000 Hz/sec to said container to stir and increase the temperature of said distilled liquor up to about 35° C., thereby accelerating the oxidation and thus the aging of said distilled liquor.

2. An aging device for a distilled liquor comprising:
    an aging tank for containing said distilled liquor, said aging tank having an inlet and an outlet for said distilled liquor;
    an ozone supplying unit having an inlet pipe and an outlet pipe which are connected to said aging tank;
    a cooling unit mounted to said aging tank;
    an ultrasonic vibration unit mounted to said aging tank; and
    a thermometer mounted on said aging tank to detect the temperature of said distilled liquor.

3. The aging device as claimed in claim 2, wherein said cooling unit includes a compressor and a condensing tube.

* * * * *